April 12, 1955  D. L. WAUGH  2,705,823
BELT CONNECTOR
Filed July 18, 1952

INVENTOR.
DALE L. WAUGH
BY
ATT'Y.

United States Patent Office 2,705,823
Patented Apr. 12, 1955

2,705,823

BELT CONNECTOR

Dale L. Waugh, Dayton, Ohio, assignor to The Dayton Rubber Company, a corporation of Ohio Application July 18, 1952, Serial No. 299,610

6 Claims. (Cl. 24—33)

This invention relates to a connector for joining together the ends of a belt and, more particularly, to a connector of the type in which two bearings fastened to the ends of the belt are joined by a link having pins journaled in the bearings.

In belt connectors of the type in which the connection is effected by a pair of bearing members supported by straps secured to the ends of the belt, the bearings being joined by a link provided with bearing pins, the bearings tend to wear on one side, that is, on the side against which the bearing pin presses when the belt is under tension. As a consequence, the life of the bearings is considerably reduced due to the uneven wear thereon. This disadvantage may be overcome by turning the bearings as the belt operates over the pulleys so that the wear on the bearings will occur evenly on all sides thereof and thereby greatly lengthen the life of the connector.

Accordingly, it is an object of this invention to provide a belt connector of the bearing and link type which will provide greater service and much longer life than conventional belt connectors of this type.

Another object of the invention is to provide a belt connector of the bearing and link type in which means is provided for causing the bearings to be turned in the straps while the belt is operating over the pulleys.

Another object of the invention is to provide a bearing which will be rotated by a ratchet device which is effective on each flexing of the connector as it passes around a pulley.

With these and other objects in view which will become apparent from the following description, the invention includes certain novel features of construction and combinations of parts, the essential elements of which are set forth in the appended claims and a preferred form or embodiment of which will hereinafter be described with reference to the drawings which accompany and form a part of this specification.

Figure 1:
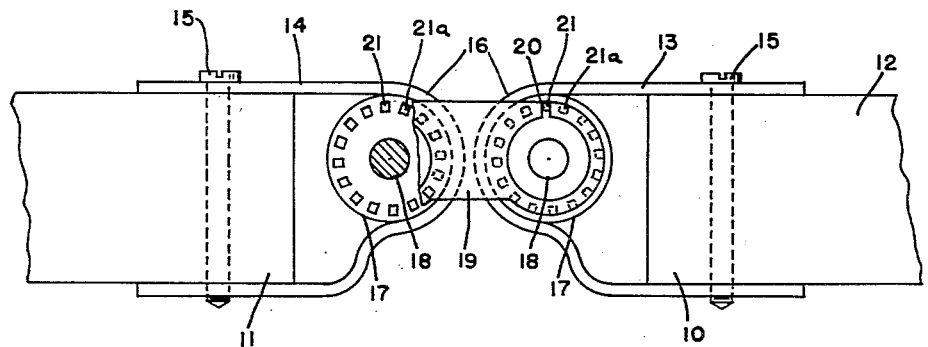
Figure 1 is a side view of a belt connector incorporating the features of my invention as it appears while the belt ends are in a straight line.

As best shown in Figure 1 of the drawings, the belt ends 10 and 11 of a V-belt 12 are fitted with straps 13 and 14, respectively. The straps 13 and 14 are secured to the belt ends by means of screws or nails 15 in the well-known manner. Each strap is provided with a loop or bight 16 for receiving a circular bearing 17 which is preferably formed of a tough, fibrous material, such as rawhide, which will withstand wear and rough usage. Each bearing 17 is provided with an axial bore within which is received a bearing pin 18, the ends of the pins being connected by a pair of side plates 19 so as to provide a unitary link, the pins of which are journaled in the bearings 17.

Figure 3:
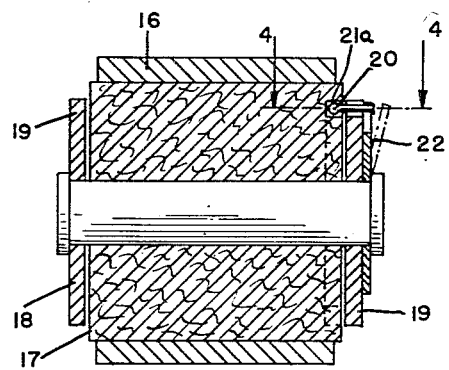
Figure 3 is an end view in section of the connector taken on line 3—3 of Figure 2.
Figure 4:
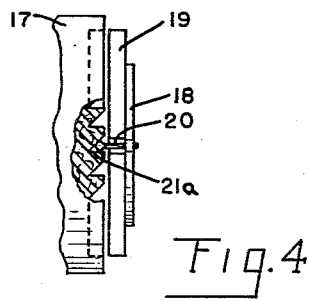
Figure 4 is an expanded fragmentary plan view partially in section taken on line 4—4 of Figure 3 and showing the manner of engagement of the ratchet mechanism.

When the connector is in use and the belt 12 is under tension, the bearing pins 18 will bear against the inner faces of the bores provided in the bearings 17 and all of the wear on the bearings will take place at this point. As a consequence, the bores provided in the bearings will soon become elongated or out of round and will soon require replacement if some means is not provided for avoiding this result. In order to prevent this uneven wear on the bearings from occurring, I have provided means for causing the bearings to be rotated in an incremental or step-by-step manner as the belt connector flexes when it passes around the pulleys. Toward this end, pawls 20 are perpendicularly mounted at each end of side plate 19 in such a manner as to be yieldably urged to engage the interdental spaces concentrically aligned about the ends of the bearings 17. For the purpose of illustration, in Figures 3 and 4 the pawl 20 projects through an opening or slot in the side plate but is held against the bearing end by the spring arm 22 to which the pawl is attached. The pyramidal depressions about the periphery of the bearing end have one surface parallel to the pawl 20 and an opposed surface angularly disposed thereto. When the bearing as shown in Figure 4 tends to rotate in clockwise fashion, the rotation is checked by the impingement of the pawl and the depression surface parallel to it. When the bearing tends to rotate in a counterclockwise manner, however, the inclined surface coacts with the pawl by transmitting the rotational force of the bearing into a component generally perpendicular to the pawl so that the pawl slides out of the depression forcing spring member 22 away from the side plate, and allowing the bearing to rotate an increment of distance.

The ratchet mechanism described may be varied by substituting any suitable teeth in the form of depressions or protrusions to be placed about the periphery of the bearing surface at the ends. The pawl, which may, if desired, be mounted on the belt strap or the side plates, may be arranged in any manner to engage the teeth and to allow rotation of the bearing in one direction while preventing it in the other.

Figure 2:
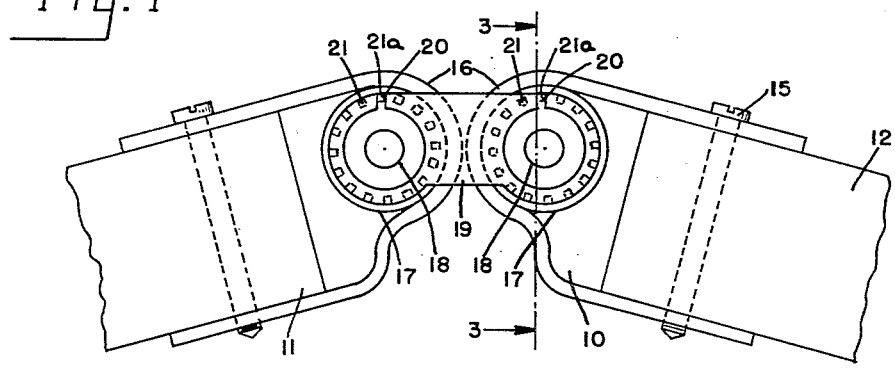
Figure 2 is a side view of the belt connector as it is flexed in passing around a pulley.

The operation of the device is as follows:

As the belt 12 operates over a pulley the connector flexes from the straight position of Figure 1 to the angular position of Figure 2 as it enters upon and conforms to the curvature of the pulley. During this positive flexure, each bearing member 17 is held securely within the bight 16 of its strap so that the rotational movement of each strap relative to the bearing pins and side plates is transferred to the bearing member which will tend to rotate in a counterclockwise manner about the bearing pin as a result of the frictional forces involved. As explained above, this counterclockwise rotational force causes the pawl 20 to slide out of depression 21; and as the rotation continues, the pawl comes to rest in another depression 21a. This fractional rotation of the bearing member 17 obtains the desired result of presenting a new bearing surface between the bearing wheel and the pin.

Then as the connector leaves the pulley, it moves from its flexed position to conform to the straight path of the belt on its way to the next pulley, thus tending to impart a clockwise rotation to the bearing member 17. Such rotation about the bearing pin 18, however, is prevented by the engagement in parallel of the pawl 20 and the axially indented surface of the depression 21a. The movement which does occur is accordingly between the bearing wheel 17 and the bight of the strap. This fractional rotation causes a new surface of the bearing member to engage the bearing surface of the strap.

Each time the connector passes about a pulley as described above, the bearing member alternately rotates a fraction of a revolution about the bearing pin and a fraction of a revolution within the bight of the strap. Because of the constant change in bearing surfaces thus resulting, the pins 18 and the straps 16 will wear the bearing wheels 17 in a uniform and even manner, and the difficulty caused by uneven wear on the bearing wheels will be overcome.

Referring again to the ratchet mechanism in Figure 4, it is necessary that the depressions 21a be sufficiently close together so that during the positive flexure of the connector as it enters upon the pulley, the counterclockwise rotation of the bearing wheel will bring a new depression into engagement with the pawl 20. If such new engagement does not take place, the counterclockwise gain will be lost as the connector leaves the pulley and the clockwise rotation of the bearing wheel will simply return the same depression into engagement with the pawl, and no resultant change in the bearing surfaces will be effected.

Although I have described my invention in considerable detail and have, therefore, utilized certain specific terms and language herein, it is to be understood that the present disclosure is illustrative rather than restrictive and that changes and modifications may be resorted to without departing from the spirit or the scope of the claims appended hereto.

I claim:

1. A connector for joining together the ends of a belt running over a set of pulleys, comprising a pair of U-shaped straps for attachment to the belt ends to be joined, a link for joining together said straps, said link including a pair of bearing blocks adapted ot be received within the bights of said straps, a bearing pin journaled in each of said blocks and a pair of side plates connected to the ends of said pins for holding them in spaced relationship, and means for turning said bearing blocks relative to said straps as the belt operates over the pulleys connected thereby, said means comprising a series of teeth spaced about the periphery of said bearing blocks and advancing fingers carried by said straps for cooperation with said teeth.

2. The connector of claim 1 in which said fingers are so arranged with respect to said teeth as to always act on said teeth to rotate said blocks in one direction.

3. A connector for joining together the ends of a belt running over a set of pulleys comprising a pair of straps for attachment to the belt ends to be joined; a link for joining together said straps said link including a pair of bearing blocks adapted to be received within the bights of said straps and positioned between a pair of side plates, a bearing pin journaled in each of said blocks said bearing pins being connected by said side plates, and means for intermittently turning said bearing blocks within the bight of said straps as the connector passes over the pulley so as to prevent one-sided wear on said blocks by said bearing pins, said turning means comprising a series of teeth spaced about the periphery of said bearing blocks and projecting members carried by said link for cooperation with said teeth.

4. The connector of claim 3 in which said projecting members are positioned on one of said side plates.

5. A connector for joining together the ends of a belt running over a set of pulleys comprising a pair of straps for attachment to the belt ends to be joined, a link for joining together said straps, said link including a pair of bearing members adapted to be received within the bights of said straps and positioned between a pair of side plates, a bearing pin journaled in each of said members, said pins being connected by said side plates, and a spring-mounted pawl carried by said link and yieldably engaging ratchet forming depressions spaced about the periphery of said bearing member whereby a rotative force upon said bearing member will push said pawl out of depression with which it is engaged to allow rotation of said bearing member about said bearing pin while a reverse rotative force will lock said pawl within its engaging depression to prevent rotation of said bearing member about said pin.

6. A connector for joining together the ends of a belt running over a set of pulleys comprising a pair of straps for attachment to the belt ends to be joined, a link for joining together said straps, said link including a pair of bearing blocks within the bights of said straps and a pair of side plates connecting bearing pins journaled in each of said blocks, means on said blocks and cooperatively engaging means on said link forming a ratchet mechanism for intermittently turning said bearing blocks relative to said pins and said straps as the connector passes over the pulley so as to prevent one-sided wear on said blocks by said bearing pins.

References Cited in the file of this patent

UNITED STATES PATENTS

| 566,995 | Mitchell | Sept. 1, 1896 |
| 2,118,750 | Welsh | May 24, 1938 |

FOREIGN PATENTS

| 15,072 | Great Britain | of 1907 |